UNITED STATES PATENT OFFICE.

JOHN L. STEWART AND JAMES L. HASTINGS, OF PHILADELPHIA, PENNSYLVANIA, ASSIGNORS, BY MESNE ASSIGNMENTS, TO THE WELSBACH INCANDESCENT GAS LIGHT COMPANY, OF JERSEY CITY, NEW JERSEY.

PLASTIC MINERAL COMPOSITION, &c.

SPECIFICATION forming part of Letters Patent No. 396,302, dated January 15, 1889.

Application filed September 25, 1885. Serial No. 178,208. (No specimens.)

*To all whom it may concern:*

Be it known that we, JOHN L. STEWART and JAMES L. HASTINGS, of Philadelphia, in the county of Philadelphia and State of Pennsylvania, have invented certain new and useful Improvements in Plastic Mineral Compositions and Vitreous or Crystalline Compounds; and we do hereby declare that the following is a full, clear, and exact description of the invention, which will enable others skilled in the art to which it appertains to make and use the ame.

This invention relates to a new plastic mineral composition and vitreous or crystalline compound for use in chemical and other arts and for incandescent illumination, said composition being adapted for molding into articles of various forms and for coating metallic and other articles to protect them from the oxidizing and corroding influences of air, moisture, acids, &c., and from injury by heat. The plastic compound, when properly burned or fired, is highly refractory, very hard, crystalline in structure, rough on the surface, white or opalescent, and practically infusible.

The object of the invention is to produce a readily-incandescing compound capable of resisting the action of intense heat, and particularly adapted for forming incandescent burners or attachments of burners for illumination with coal-gas, or water-gas, or natural gas.

The plastic compound is formed of a mixture of ingredients in about the following proportions: Calcium oxide or carbonate, two hundred and ten grains; magnesia oxide or carbonate, forty grains; caustic strontia or carbonate, one hundred and eighty grains; alumina oxide or carbonate, fifteen grains; calcium fluoride, (fluor-spar,) one hundred grains; feldspar, added after first heating, two grains to one hundred grains of the mixture of above ingredients.

The materials are ground dry or in oil or water to an impalpable powder, and then subjected to a moderately-high heat for a short time. The compound is then reground and the pulverized feldspar added, and the resulting powder is intimately mixed in white or best varnish, or its equivalent, to the proper consistency for convenient handling or application. The mixture of ingredients having been properly effected, the compound is molded into the desired articles, or coated upon articles of metal or other material, and in such forms is subjected to a suitable temperature to drive off the volatile hydrocarbon or other volatile matter, and then to a high heat in a gas or other furnace, and may afterward be suspended in a gas-flame, or placed in burning gas in the open air, for completing the process of burning and for testing and proving the finished articles.

The proportions of mineral ingredients above mentioned for forming the compound and various forms of burner attachments for illumination with gas give satisfactory results; but we do not limit ourselves to the proportions stated, as we believe other proportions will give good results, and they may be varied without departing from our invention.

The mineral ingredients may be pulverized in the dry state and the hydrocarbon or other oil afterward added.

Having described our invention, what we claim, and desire to secure by Letters Patent, is—

1. A composition for forming a refractory crystalline compound, consisting of calcium oxide or carbonate, magnesia oxide or carbonate, caustic strontia or carbonate, alumina oxide or carbonate, calcium fluoride, (fluor-spar,) feldspar, and hydrocarbon oil, or its equivalent.

2. A refractory crystalline compound composed of calcium oxide or carbonate, magnesia oxide or carbonate, caustic strontia or carbonate, calcium fluoride, (fluor-spar,) and feldspar, said compound being white or opalescent, rough on the surface, and practically infusible.

In testimony that we claim the foregoing as our own we affix our signatures in presence of two witnesses.

JOHN L. STEWART.
JAMES L. HASTINGS.

Witnesses:
WM. R. BROWN,
CHAS. MATHEWS, Jr.